United States Patent
Roberts et al.

(10) Patent No.: US 8,755,830 B2
(45) Date of Patent: Jun. 17, 2014

(54) SYSTEM AND METHOD TO FACILITATE TIME MANAGEMENT FOR PROTECTED AREAS

(75) Inventors: Robin U. Roberts, Orlando, FL (US);
Peter Stanforth, Winter Springs, FL (US); Joel T. Rannebarger, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 216 days.

(21) Appl. No.: 13/346,246

(22) Filed: Jan. 9, 2012

(65) Prior Publication Data

US 2013/0178239 A1    Jul. 11, 2013

(51) Int. Cl.
*H04B 7/00*      (2006.01)

(52) U.S. Cl.
USPC ............. 455/510; 455/512; 455/62; 455/454; 370/329

(58) Field of Classification Search
USPC ................ 455/512, 62, 67.16, 509, 450, 454, 455/452.1, 452.2, 517, 451, 464; 370/319, 370/252, 329, 204
See application file for complete search history.

(56) References Cited

U.S. PATENT DOCUMENTS

| | | | |
|---|---|---|---|
| 6,952,563 B2 * | 10/2005 | Brown et al. .............. | 455/67.11 |
| 2008/0112308 A1 | 5/2008 | Cleveland | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0003201 A1 | 1/2009 | Horvitz | |
| 2009/0046625 A1 | 2/2009 | Diener et al. | |
| 2009/0161617 A1 | 6/2009 | Abedi | |
| 2009/0197627 A1 | 8/2009 | Kuffner et al. | |
| 2010/0105332 A1 | 4/2010 | McHenry et al. | |
| 2010/0197317 A1 * | 8/2010 | Sadek et al. ............... | 455/452.2 |
| 2011/0077042 A1 | 3/2011 | Stanforth et al. | |
| 2011/0287802 A1 * | 11/2011 | Ma et al. ........................ | 455/517 |
| 2012/0163309 A1 * | 6/2012 | Ma et al. ........................ | 370/329 |
| 2013/0165051 A9 * | 6/2013 | Li et al. ......................... | 455/67.7 |
| 2013/0196677 A1 * | 8/2013 | Smith et al. ................. | 455/452.1 |
| 2013/0203435 A1 * | 8/2013 | Smith et al. ................... | 455/454 |

OTHER PUBLICATIONS

47 C.F.R. 15.713, Feb. 17, 2009 and amended Dec. 6, 2010.
"Digital Dividend: Cognitive Access, Consultation on License-Exempting Cognitive Devices using Interleaved Spectrum", Ofcom, Publication Date: Feb. 16, 2009.
By the Commission, "Second Report and Order, Order on Reconsideration, and Second Further Notice of Proposed Rulemaking", Federal Communications Commission, 2004, FCC 04-167, WT Docket No. 00-230, pp. 1-180.

(Continued)

*Primary Examiner* — Sujatha Sharma
(74) *Attorney, Agent, or Firm* — Renner, Otto, Boisselle & Sklar, LLP

(57) ABSTRACT

Spectrum that will become venue-protected in the future is made available to radio devices by a central control system with which the radio devices requests spectrum access information for use in wireless communication. The central control system establishes a re-request time duration specified in an amount of time that will elapsed at or before the spectrum becomes protected. The elapsing of the re-request duration serves as a command to the radio device to transmit a new channel request to the central control system.

24 Claims, 2 Drawing Sheets

(56) References Cited

OTHER PUBLICATIONS

FCC 08-260, Second Report and Order and Memorandum Opinion and Order, Adopted Nov. 4, 2008 and Released Nov. 14, 2008.
Kwerel, Evan et al., "A Proposal for a Rapid Transition to Market Allocation of Spectrum", Federal Communications Commission, 2002, OPP Working Paper No. 38, pp. 1-50.
Radio Spectrum Management, Module 5 of ICT Regulation Toolkit, ITU, 2007.
Prabhu, Krish et al., "Time for Action" Genuine Ideas, 2002, [retrieved online Feb. 1, 2008], <http://www.genuineideas.com/ArticlesIndex/TimeForAction.htm>.
U.S. Spectrum Management Policy: Agenda for the Future, 1991.
Jones, Steven K. et al., "Initial Evaluation of the Performance of Prototype TV-Band White Space Devices", (2007), OET Report, FCC/OET 07-TR-1006.
International Search Report and Written Opinion from corresponding International Application No. PCT/US13/20191, mailed on Mar. 11, 2013.

\* cited by examiner

SYSTEM AND METHOD TO FACILITATE TIME MANAGEMENT FOR PROTECTED AREAS

TECHNICAL FIELD OF THE INVENTION

The technology of the present disclosure relates generally to complying with regulated spectrum and, more particularly, to a system and method for managing spectrum use by radio devices in a protected zone by normalizing time values associated with spectrum requests and spectrum use allocations.

BACKGROUND

Wireless networks and systems are becoming increasingly popular, but wireless communications are constrained due to a lack of available, interference free spectrum that may be used for reliable communications within a geographic area. Efforts have been made to identify more efficient and effective ways of utilizing radio spectrum. One technique is spectrum sharing. Sharing is most easily implemented using a management system that can identify when and where spectrum is available and direct radio access networks to use the available spectrum under certain constraints. One example of this type of approach is the management of TV whitespace. To avoid interference with digital TV broadcasts and other incumbent systems, radios that intend to use the TV whitespace are required receive a list of available channels (also referred to as a channel map or a channel list) from a designated database.

TV whitespace regulations allow for one or more channels in a graphical area to be protected from interfering use over a period of time specified in terms of a start date and time and a duration (or an end date and time). But knowledge of time by radio devices, especially mobile devices, is imprecise to the point that radio devices cannot adequately comply with protections. For example, some radio devices are capable of obtaining location information and an absolute time from the global positioning system (GPS). But these radio devices may not be capable of interpreting the device's location to adjust for factors such as time zone differences or daylight savings time. Therefore, the devices cannot accurately determine the local time to ensure compliance with any spectrum protections.

DETAILED DESCRIPTION OF EMBODIMENTS

Figure 1:
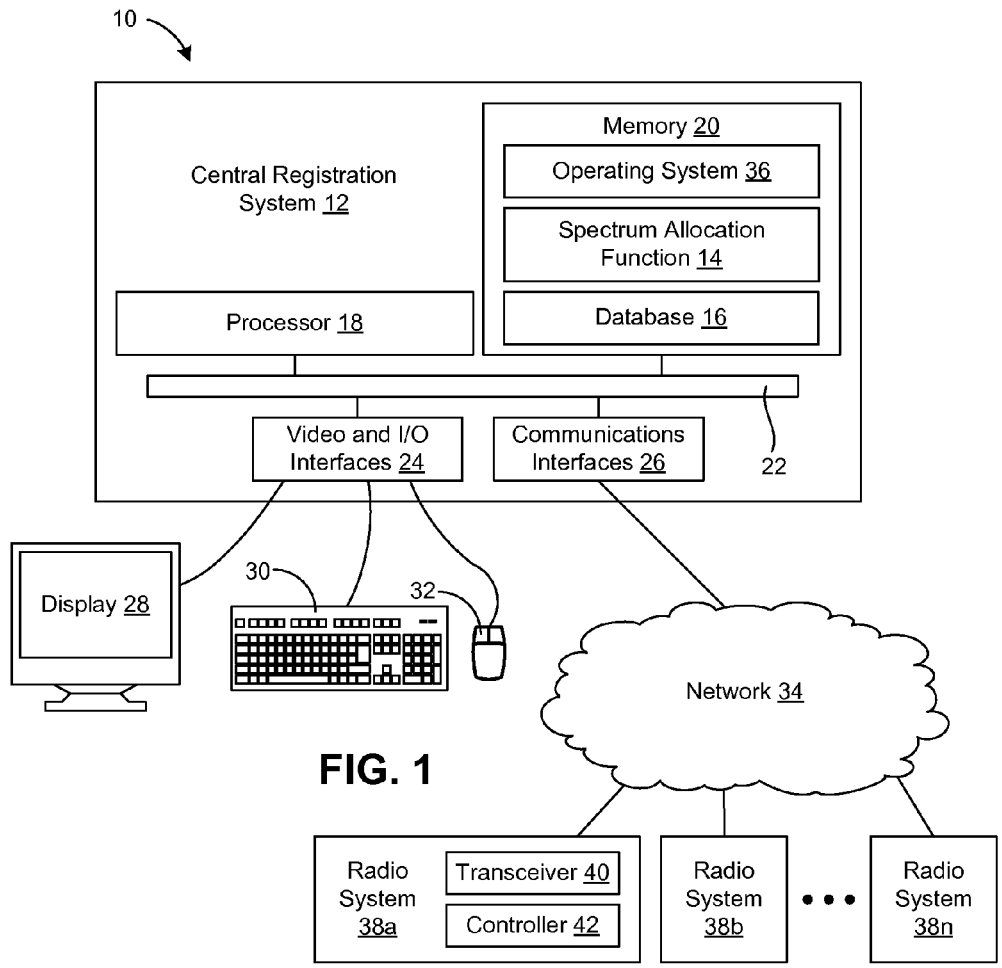
FIG. 1 is a schematic view of an exemplary system for determining available whitespace channels and providing a control mechanism to a radio device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Overview

A(1). Parties

Various entities are described in this document that may have a relationship to electromagnetic spectrum for use in wireless communications. One entity is a government or regulatory agency. In the United States, for example, the governmental agency typically is the Federal Communications Commission (FCC). The governmental agency controls the rules and/or regulations for how wireless spectrum may be used.

Another party may be an incumbent spectrum user. Incumbent spectrum users include users that have priority to use certain spectrum without interference from other users (e.g., including through a government agency license) or have "grandfather" rights to certain spectrum.

Another party may be a spectrum user that does not have predetermined access rights to spectrum through a license or through an incumbent user's rights, but is interested in deploying a radio system that requires spectrum in order to operate. An exemplary radio system that a spectrum user may be interested in deploying is a TV whitespace band radio (TVBD), which is required to request channels for spectrum access.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In addition, the systems and methods are described in the exemplary context of a TVBD that requests a channel list to enable access to available whitespace channels in circumstances where one or more channels in the geographic area of the TVBD is protected from interfering use over a specified period of time. A protected venue refers to a combination of a geographic area, a period of time (having a start date and time and a duration, or a start date and time and an end date and time), and one or more channels or other spectrum description. Therefore, the requesting TVBD is not entitled to use the spectrum of the venue during the venue's period of time.

Although described in this context, the disclosed systems and method also may be applied to other circumstances where radios register for, request, or seek out spectrum to conduct wireless communications.

For purposes of description, radio systems with priority to the spectrum in question will be referred to as primary spectrum users or primary radio systems. In the exemplary context of TV whitespace, primary spectrum users may be, for example, the incumbent radio systems described in this document. Radio systems that have spectrum access rights that are subservient to the primary spectrum users will be referred to as secondary spectrum users or secondary radio systems. In the exemplary context of TV whitespace, secondary spectrum users may be, for example, the TVBDs described in this document. Typically, available whitespace channels are interleaved with spectrum used by the primary radio systems.

B. System Architecture

With reference to FIG. 1, illustrated is a schematic block diagram of a computer-based system 10 capable of executing computer applications (e.g., software programs). The system 10 may include a central control system 12 that is implemented using computer technology. The central control system 12 may be configured to execute a spectrum allocation function 14 and to store a database 16 that contains data regarding spectrum information that is used by the spectrum allocation function 14. The database 16 may store, for example, information about occupied channels and channel protections (e.g., venues). Alternatively, this information may be obtained from one or more third-party databases when needed to perform various functions of the spectrum allocation function 14.

In one embodiment, the spectrum allocation function 14 is embodied as one or more computer programs (e.g., one or more software applications including compilations of executable code). The computer program(s) and/or database 16 may be stored on a machine (e.g., computer) readable medium, such as a magnetic, optical or electronic storage device (e.g., hard disk, optical disk, flash memory, etc.).

To execute the function 14, the system 12 may include one or more processors 18 used to execute instructions that carry out a specified logic routine(s). In addition, the system 12 may have a memory 20 for storing data, logic routine instructions, computer programs, files, operating system instructions, and the like. As illustrated, the function 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The system 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the system 10 to send and receive data signals, voice signals, video signals, and the like to and from other computing devices via an external network 34 (e.g., the Internet, a wide area network (WAN), a local area network (LAN), direct data link, or similar systems). The interface between the system 12 and any operatively interfaced device or network may be wired or wireless.

The memory 20 may store an operating system 36 that is executed by the processor 18 to control the allocation and usage of resources in the system 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the function 14, depend as is generally known by those with ordinary skill in the art. The operating system 36 also may control much of the user interface environment presented to a user, such as features of the overall graphical user interface (GUI) for the system 12.

In one embodiment, the system 12 may be configured as a server that executes the function 14 to host the below-described functions for one or more radio systems 38 that are required to obtain access to spectrum for operation, such as through a temporary transfer of spectrum use rights or a registration process. As indicated, for purposes of description the radio devices 38 (labeled in FIG. 1 is radio device 38$a$ through 38$n$) in the following exemplary embodiments are TVBDs that rely on TV whitespace for operation. Each radio system 38 may be an individual radio device or a network of radio devices. Also, each radio system 38 may include at least one transceiver 40 for engaging in wireless communications and a controller 42 for managing radio system operation, including carrying out the below-described functions of the radio system 38. The controller 42 may include a processor for executing logical instructions (e.g., software) that are stored by a non-transitory computer readable medium (e.g., stored in a memory) and embody the described functionality. In other embodiments, the controller is implemented with a firmware-based microcontroller or in dedicated circuitry (e.g., an application-specific integrated circuit or ASIC).

Under current FCC procedure, TVBD radios will request channels every twenty-four hours. Also, for mobile TVBD radios that do not have a fixed location, the mobile TVBD radio will request channels each time the TVBD radio changes location. In one embodiment, the radio systems 38 interact with the central control system 12 over the Internet using electronic messaging. Furthermore, the function 14 may be considered an expert system for allocating spectrum in a manner that increases the operational capacity of the corresponding spectrum and reduces interference among systems that use the spectrum.

While the spectrum allocation process for at least the radio systems 38 may be fully automated, the function 14 may host an Internet-style website for the various parties to conduct manual requests, if needed, access various tools and reports supplied by the function 14, and so forth.

C. Spectrum Allocation

The system 12 is configured to identify spectrum that is available for use by a radio system 38 that requests spectrum. Exemplary requests for spectrum may be in the form of a request for a list of available channels (e.g., a TV whitespace request) or for an available block of spectrum. An available block of spectrum may be defined in terms of spectrum-defining data, such as geography, time, frequency mask, and transmit power level. As part of the functions of the system 12, the system 12 is configured to reliably determine when the requesting radio device 38 is not permitted to use spectrum (e.g., channels) that are occupied by virtue of being designated as a protected venue. This determination is made, in part, by normalizing the time of the request and providing a consistent and understandable control mechanism to the requesting radio device 38.

Figure 2:
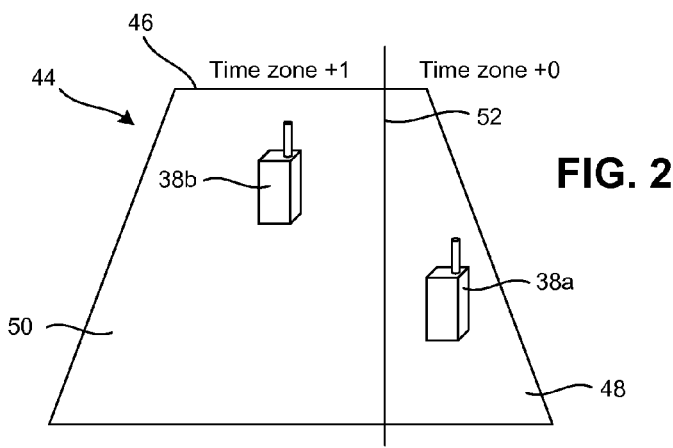
FIG. 2 is a diagram depicting radio devices that are located in different time zones and within a protected venue.

With additional reference to FIG. 2, a venue 44 may be established. Establishment of the venue 44 may be carried out by registering the venue 44 with the system 12. Alternatively, the venue 44 may be established through a third party venue clearing-house system (not shown), which communicates the venue 44 to the system 12. The venue 44 protects a channel or other block spectrum for a geographic area 46 and for a period of time. The period of time may be specified, for example, using a start date and time and a duration, or using a start date and time and an end date and time. In the exemplary illustration of FIG. 2, the geographic area 46 is a trapezoid, but any shape is possible. The geographic area 46 may be specified in terms of coordinates, metropolitan (e.g., city) boundaries, postal-codes, FCC defined areas (e.g., basic trading areas or BTAs, major trading areas or MTAs, etc.), or in any other appropriate manner. In the illustrated example, a first part 48 of the geographic area 46 of the venue 44 in a first time zone (time zone+0) and a second part 50 of the geographic area 46 of the venue 44 is in a second time zone (time zone+1) adjacent the first time zone. The demarcation between the first and second time zones is illustrated with line 52.

For convenience of a person that is configuring the venue, the time for the venue may be entered and displayed as a local time in terms of date, hour and minutes, and time zone (or a location from which the time zone may be determined). The local time may be the local time for the geographic area 46, accounting for the time zone of that location and whether daylight savings time, if applicable, is in effect. In one embodiment, venues 46 that are in more than one time zone may be specified as a multi-part venue having a geographic area and protected time for each time zone or as a single venue having a time referenced to one of the time zones. The system 12 will convert any local time values that are provided to the system 12 to a time value in accordance with a predetermined universal time system that is based on a universal time reference. An exemplary universal time system is coordinated universal time (UTC).

When the radio device 38 submits a request for a channel list to the system 12, the system 12 converts the time of the request to a time value in accordance with the predetermined universal time. The time of the request may be a timestamp in the request or a time of receipt by the system 12. Conversion of time values specified by date and time for a location to time values under the predetermined universal time system is readily accomplished by the system 12 with accuracy since the system 12 may be considered to have a fixed location, even if the system 12 is implemented in a distributed manner across more than one server bank. The fixed location will have a known and fixed time offset from the universal time reference and, therefore, any local time values at any location may be converted to time values under the universal time system.

Reliance on universal time values and, when appropriate, conversion of local time values to universal time values is considered for purpose of this document normalization of time values.

The radio device 38 need not be aware of the local time at its location or the universal time reference, or rely on normalization of time. In one embodiment, the radio device 38 may be implemented to carry out spectrum request and spectrum use functions without knowledge of a current time. Rather, and as will be discussed below, the radio device 38 may track the amount of time that elapses from an event, such as the receipt of a channel list, to make determinations regarding spectrum usage and when to request a new channel list.

Figure 3:
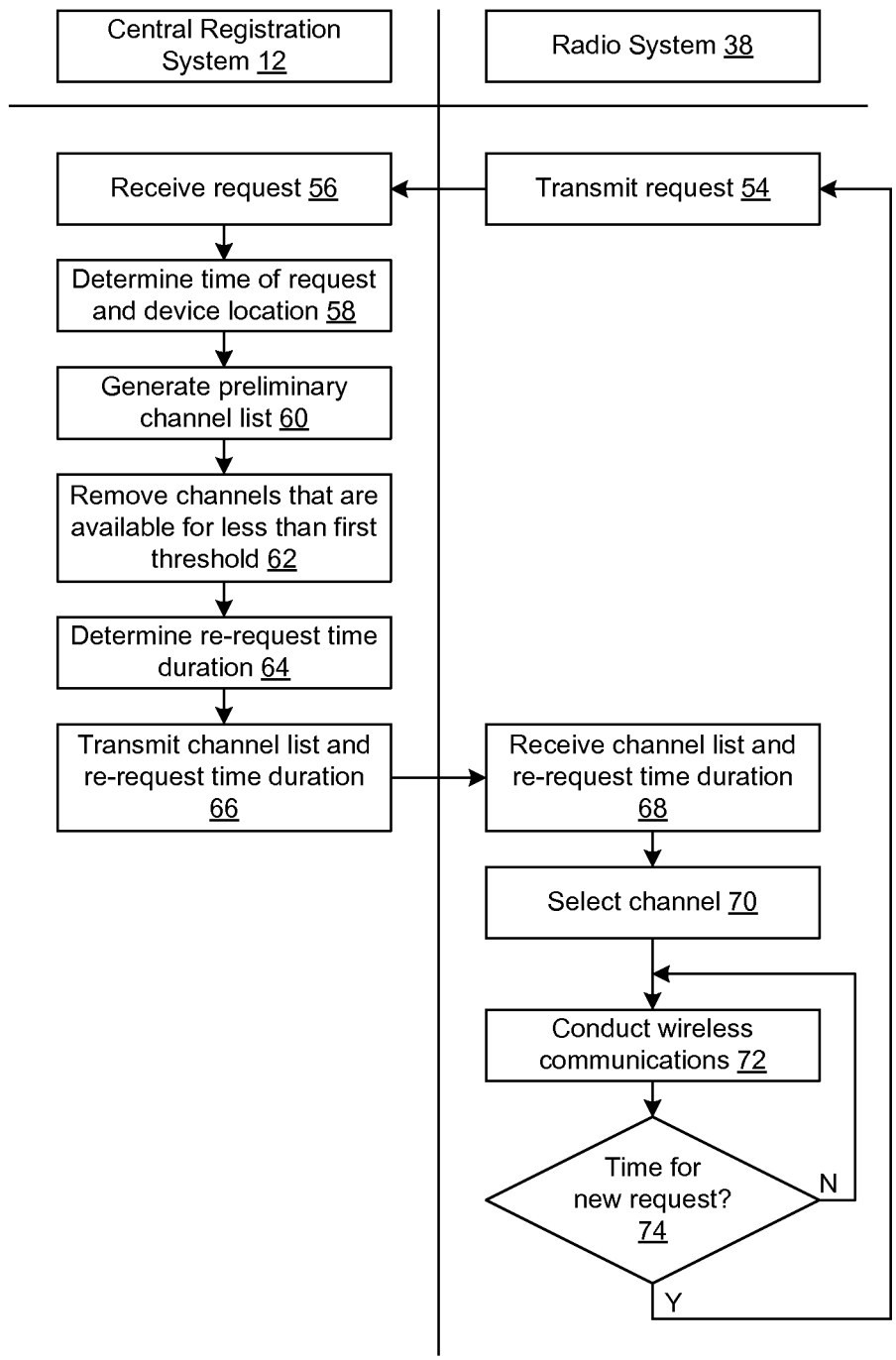
FIG. 3 is a flow diagram representing exemplary actions taken by the system of FIG. 1 and a radio device.

When a request for a channel list is received by the system 12 (blocks 54 and 56 of FIG. 3), the system 12 will determine the normalized time of the request and the location of the requesting radio device 38 (block 58 of FIG. 3). The location may be specified as part of the information provided by the radio device 38. The location information may be determined by the radio device 38 using, for example, a global position system (GPS) or assisted GPS (AGPS) approximation of location. Another location determination technique is to use a postal address, such as a street address or a zip code (e.g., in the United States a "zip+4" code may provide a sufficiently accurate location estimation). Other information that may be provided in the channel request may include broadcast parameters (e.g., antenna height, antenna configuration, broadcast power, etc.) and identity information (e.g., operator identity, operator contact information, FCC license information, radio type, radio manufacturer and model number, etc.).

Next, in block 60, the system 12 will determine a preliminary list of available channels (or preliminary channel list) on which the requesting radio device 38 may operate. The preliminary channel list includes all channels that, at the time of the request and for the location of the device 38, are not occupied by an incumbent user or protected by a venue. In block 62, the system 12 also determines if any of the channels in the preliminary channel list will become not available due to a venue coming into effect within a first time threshold. The first time threshold may be, for example, one hour. Those channels from the preliminary channel list of available channels that are available for less than the first time threshold will be removed from the preliminary channel list. The result is a channel list for the requesting radio device 38.

Next, in block 64, the system 12 determines a re-request time for the radio device 38. The re-request time is a time duration specified in hours (or hours and minutes) from the current time. When the time duration elapses, the radio device 38 will send a new channel request to the system 12 to obtain a new channel list. The re-request time duration is determined by identifying if any channels in the channel list that are associated with a protected venue that commences within a second time threshold from the current time and for the location of the radio device 38. The second time threshold may be selected to determine venues that commence proximal in time to the current time, but sufficiently far enough in the future to allow use of the channel before the venue commences. The second time threshold may be, for example, twenty four hours, forty eight hours, or some other length of time.

From the venues that commence within the second time threshold, the venue with the start time closest to the current time is determined. The re-request time is the amount of time until the closest venue start time less a buffer amount of time to allow for processing of the re-request prior to commencement of the protection of the venue. The buffer amount of time may be, for example, about one hour. In one embodiment, the buffer amount of time is the same as the first time threshold. When the radio device 38 re-requests a channel list at the re-request time, the channel with the start time closest to the current time will be excluded from the channel list.

Under the foregoing approach, any channels associated with a venue that goes into effect with a predetermined amount of time (e.g., the first time threshold and/or the buffer amount of time) will not be available for use by the radio device 38. In one embodiment, all durations until the commencement of a venue are rounded up to next whole hour. Also, any time values reported back to the radio device 38 will be specified in the form of increments of time (e.g., in number of hours, in number of minutes, or in number of hours and number of minutes). Therefore, the system 12 does not use time values specified by date and time when specifying time values to the radio device 38 (e.g., using representative values for purposes of an example, the system 12 would not send a response that reports to the effect that "channel X is available until 4 pm"). Rather, the communication to the radio device 38 will provide an increment of time, such as a communication that conveys the length of time that a specific channel is available or the length of time that a channel list is valid (e.g., again using representative values for purposes of an example, "the channel list is valid for 180 minutes").

In blocks 66 and 68, the system 12 communicates the channel list and the re-request time to the radio device 38. Then, in block 70, the radio device 38 selects one of the available channels from the channel list for use. In block 72, the radio device 38 carries out wireless communications using the selected channel. Next, in block 74, the radio device 38 determines if it is time to submit a new request for a channel list to the system 12 by returning to block 54. If it is not time to submit a new request, the wireless communications continue. A positive determination may be made in block 74 by determining that channels must be re-requested under regulatory agency (e.g., the FCC) requirements, such as by the elapsing of a predetermined amount of time since the last channel request (e.g., 24 hours) or by movement of the radio device 38 to a new location.

A positive determination also may be made in block 74 by determining that the duration of the re-request time has elapsed. To make this determination, the radio device 38 tracks elapsed time from receipt of the channel list and re-request time duration. If the elapsed time is greater than the re-request time duration, a positive determination is made. If the elapsed time is less than the re-request time, a negative determination is made and wireless communications may proceed.

The radio device 38 also may request a new channel list at other times and/or for other reasons. For instance, the radio device 38 may request a new channel list (or select a different channel from the current channel list) if the radio device 38 is unsatisfied with a quality of service (QoS) of the selected channel.

In an alternative embodiment to the process flow of FIG. 3, the system 12 provides the channel list and a validity time duration for each channel that will become protected within the second threshold amount of time. The validity time is the amount of time until the corresponding venue is scheduled to start less a buffer amount of time. If the radio device 38 selects a channel with a validity time duration, then the radio device 38 will vacate use of the channel when the validity time duration elapses. The radio device 38 may vacate use of the channel by selecting a different, and currently available, channel or by requesting a new channel list.

Under the disclosed approaches, the radio device 38 need not have to accurately apply the current time to functional determinations related to channel use or when to request available spectrum. Rather, the radio device 38 need only perform relative timing by tracking elapsed time from an event (e.g., receipt of the channel list and re-request time duration in block 68).

With reference back to FIG. 2, two mobile radio devices 38 are illustrated, labeled radio device 38a and 38b. The radio devices 38a and 38b are respectively in the first part 48 of the protected geographic area 46 and the second part 50 of the protected area 46. Time determinations made by the system 12 for the radio devices 38a and 38b will be made with their respective time zones in mind, but the relative time values made be calculated without reliance on time zones. For example, if the protection of the venue 44 is to commence in five hours from the time that both radio devices 38a and 38b request channel lists, the channel lists returned to the radio devices 38a and 38b may include the channel associated with the venue 44. Under this scenario, the radio devices 38a and 38b also will receive the same re-request time duration, which will be less than the amount of time until the protection of the venue 44 commences (e.g., under the example, a re-request time duration of five hours less the buffer amount of time).

Some exemplary types of channel lists (also referred to as channel maps) will now be described. In one embodiment, the channel list contains just the identities of channels that are available for use by the radio device 38. In another embodiment, the channel list contains all channels within the spectrum managed by the system 12 and identifies whether each channel is available or not available. Table 1 represents an exemplary channel list established under this technique for a situation where there are fifty channels that are numbered channels 2 through 51, and where channels 2, 3, 4, 47 and 49 are not available to the requesting radio device 38.

TABLE 1

| Channel Identifier | Availability |
|---|---|
| 2 | Not available |
| 3 | Not available |
| 4 | Not available |
| 5 | Available |
| 6 | Available |
| 7 | Available |
| . | . |
| . | . |
| . | . |
| 47 | Not available |
| 48 | Available |
| 49 | Not available |
| 50 | Available |
| 51 | Available |

In another embodiment, the channel list includes additional information beyond a binary-type value of whether a channel is available or not available for use. For example, the channel map returned to the radio may include the duration of time for which each channels is available. The duration of time for which each available channel is available may be determined by identifying how much time exists between the current time and the start of a venue protection for the channel. In one embodiment, if no venue is scheduled to come into effect for a channel, a predetermined maximum availability duration may be specified for that channel. Table 2 represents an exemplary channel list establish under this technique where the duration of time that each channel is available is reported.

TABLE 2

| Channel Identifier | Availability | Availability Duration |
|---|---|---|
| 2 | Not available | 0 hours |
| 3 | Not available | 0 hours |
| 4 | Not available | 0 hours |
| 5 | Available | 72 hours |
| 6 | Available | 84 hours |
| 7 | Available | 70 hours |
| . | . | |
| . | . | |
| . | . | |
| 47 | Not available | 0 hours |
| 48 | Available | 13 hours |
| 49 | Not available | 0 hours |
| 50 | Available | 92 hours |
| 51 | Available | 60 hours |

Table 3 represents an exemplary channel list under an embodiment where the re-request time duration depends in the channel that the radio device 38 selects for use. In this channel list, the available channels are identified. Also identified for each channel are how long the availability is valid and the re-request time duration for the channel. When the re-request time duration elapses for the selected channel, the radio device 38 is to re-request another channel list or stop using the selected channel and switch to a channel that is still available and for which the re-request time duration has not elapsed.

TABLE 3

| Channel Identifier | Availability | Availability Duration | Re-request Time Duration |
|---|---|---|---|
| 2 | Not available | 0 hours | 0 hours |
| 3 | Not available | 0 hours | 0 hours |
| 4 | Not available | 0 hours | 0 hours |
| 5 | Available | 72 hours | 71 hours |
| 6 | Available | 84 hours | 83 hours |
| 7 | Available | 70 hours | 69 hours |
| . | . | | |
| . | . | | |
| . | . | | |
| 47 | Not available | 0 hours | 0 hours |
| 48 | Available | 13 hours | 12 hours |
| 49 | Not available | 0 hours | 0 hours |
| 50 | Available | 92 hours | 91 hours |
| 51 | Available | 60 hours | 59 hours |

In another embodiment, the channel list provides information to indicate when a currently venue-protected channel will become available for use in the future. This information may be specified in a length of time ("time duration until available") that, when elapsed, frees the channel for use by the radio device 38. An availability duration also may be specified to close off the channel from use if it becomes subject to another venue protection. Table 4 represents an exemplary channel list establish under this approach in which the time duration until available and the availability duration are measured from the time that the channel list is generated. In Table 4, channel 2, for example, is unavailable for 10 hours, after which channel 2 is available for 14 hours. Similar to Table 3, Table 4 also includes a re-request time duration that specifies when the radio device 38 must vacate a selected channel by requesting another channel list or by stopping use of the selected channel and switching to a channel that is still available and for which the re-request time duration has not elapsed

TABLE 4

| Channel Identifier | Time Duration Until Available | Availability | Availability Time Duration | Re-request Time Duration |
|---|---|---|---|---|
| 2 | 10 hours | Not available | 24 hours | 23 hours |
| 3 | 8 hours | Not available | 31 hours | 30 hours |
| 4 | 26 hours | Not available | 53 hours | 52 hours |
| 5 | 0 hours | Available | 72 hours | 71 hours |
| 6 | 0 hours | Available | 84 hours | 83 hours |
| 7 | 0 hours | Available | 70 hours | 69 hours |
| . | | . | | |
| . | | . | | |
| . | | . | | |
| 47 | 16 hours | Not available | 96 hours | 95 hours |
| 48 | 0 hours | Available | 13 hours | 12 hours |
| 49 | 72 hours | Not available | 100 hours | 99 hours |
| 50 | 0 hours | Available | 92 hours | 91 hours |
| 51 | 0 hours | Available | 60 hours | 59 hours |

E. Conclusion

The central control system 12 provides radio devices 38 with spectrum access in a manner that facilitates compliance with channel protections, yet maximizes use of channels during periods of availability.

Although certain embodiments have been shown and described, it is understood that equivalents and modifications falling within the scope of the appended claims will occur to others who are skilled in the art upon the reading and understanding of this specification.

What is claimed is:

1. A central control system for supplying spectrum access information for use in wireless communications to radio devices that request spectrum access from the central control system, comprising:
   an interface to communicate with the radio devices; and
   a processor that executes a spectrum allocation function that is stored in a non-transitory computer readable medium and, by execution of the spectrum allocation function, the central control system configured to:
      receive a request from one of the radio devices, the request specifying a location of the radio device;
      determine spectrum that is available for use by the radio device at the location of the radio device and at the time of the request;
      determine when some of the available spectrum becomes protected from use by the radio device by commencement of a protected venue located at least in part in a time zone adjacent a time zone corresponding to the location of the radio device, the central control system normalizing a time at which the protection of the protected venue commences to a universal time;
      establish a re-request time duration specified as an amount of time that is less than an amount of time until the protection of the protected venue commences, elapsing of the re-request duration serving as a command to the radio device to transmit a new request to the central control system; and
      transmit an identification of the available spectrum and the re-request time duration to the radio device.

2. The central control system of claim 1, wherein the available spectrum is identified as a channel list containing channels available for use by the radio device, the available channels interleaved with unavailable channels.

3. The central control system of claim 2, wherein the channels are whitespace channels.

4. The central control system of claim 3, wherein the whitespace channels are TV whitespace channels.

5. The central control system of claim 2, wherein, for each available channel, the channel list further identifying a time duration that indicates how long the channel is available for use by the radio device.

6. The central control system of claim 2, wherein, for each unavailable channel that will become available by expiration of a corresponding venue protection, the channel list further identifying the unavailable channel and a time duration until the channel becomes available.

7. The central control system of claim 1, wherein the spectrum that is determined to be available excludes spectrum that will not be available within a first predetermined amount of time.

8. The central control system of claim 7, wherein the determination of when some of the available spectrum becomes protected includes spectrum that becomes protected within a second predetermined amount of time that is longer than the first predetermined amount of time.

9. The central control system of claim 8, wherein the re-request time duration is the amount of time until the soonest of the spectrum to become protected will become protected less a buffer amount of time.

10. The central control system of claim 1, wherein the re-request time duration applies to all spectrum in the identification of available spectrum so that the radio device transmits the new request at the elapsing of the re-request time duration regardless of spectrum selected by the radio device for wireless communications.

11. The central control system of claim 1, wherein a re-request time duration is established for each of plural spectrum segments that will become protected, the re-request time duration associated with spectrum selected by the radio device for wireless communications controlling when the radio device transmits the new request for spectrum access.

12. A method of supplying spectrum access information for use in wireless communications to radio devices that request spectrum access from a central control system, comprising:
receiving a request from one of the radio devices, the request specifying a location of the radio device;
determining spectrum that is available for use by the radio device at the location of the radio device and at the time of the request;
determining when some of the available spectrum becomes protected from use by the radio device by commencement of a protected venue located at least in part in a time zone adjacent a time zone corresponding to the location of the radio device, the determining including normalizing a time at which the protection of the protected venue commences to a universal time;
establishing a re-request time duration specified as an amount of time that is less than an amount of time until the protection of the protected venue commences, elapsing of the re-request duration serving as a command to the radio device to transmit a new request to the central control system; and
transmitting an identification of the available spectrum and the re-request time duration to the radio device.

13. The method of claim 12, wherein the available spectrum is identified as a channel list containing channels available for use by the radio device, the available channels interleaved with unavailable channels.

14. The method of claim 13, wherein the channels are whitespace channels.

15. The method of claim 14, wherein the whitespace channels are TV whitespace channels.

16. The method of claim 13, wherein, for each available channel, the channel list further identifying a time duration that indicates how long the channel is available for use by the radio device.

17. The method of claim 13, wherein, for each unavailable channel that will become available by expiration of a corresponding venue protection, the channel list further identifying the unavailable channel and a time duration until the channel becomes available.

18. The method of claim 12, wherein the spectrum that is determined to be available excludes spectrum that will not be available within a first predetermined amount of time.

19. The method of claim 18, wherein the determination of when some of the available spectrum becomes protected includes spectrum that becomes protected within a second predetermined amount of time that is longer than the first predetermined amount of time.

20. The method of claim 19, wherein the re-request time duration is the amount of time until the soonest of the spectrum to become protected will become protected less a buffer amount of time.

21. The method of claim 12, wherein the re-request time duration applies to all spectrum in the identification of available spectrum so that the radio device transmits the new request at the elapsing of the re-request time duration regardless of spectrum selected by the radio device for wireless communications.

22. The method of claim 12, wherein a re-request time duration is established for each of plural spectrum segments that will become protected, the re-request time duration associated with spectrum selected by the radio device for wireless communications controlling when the radio device transmits the new request for spectrum access.

23. The central control system of claim 1, wherein the protected venue has a coverage area in the adjacent time zone and the in the time zone corresponding to the location the radio device.

24. The method of claim 12, wherein the protected venue has a coverage area in the adjacent time zone and the in the time zone corresponding to the location the radio device.

* * * * *